Nov. 20, 1962  K. W. THOMPSON ETAL  3,065,156
ELECTROLYTIC pH REGULATOR
Filed Aug. 29, 1961
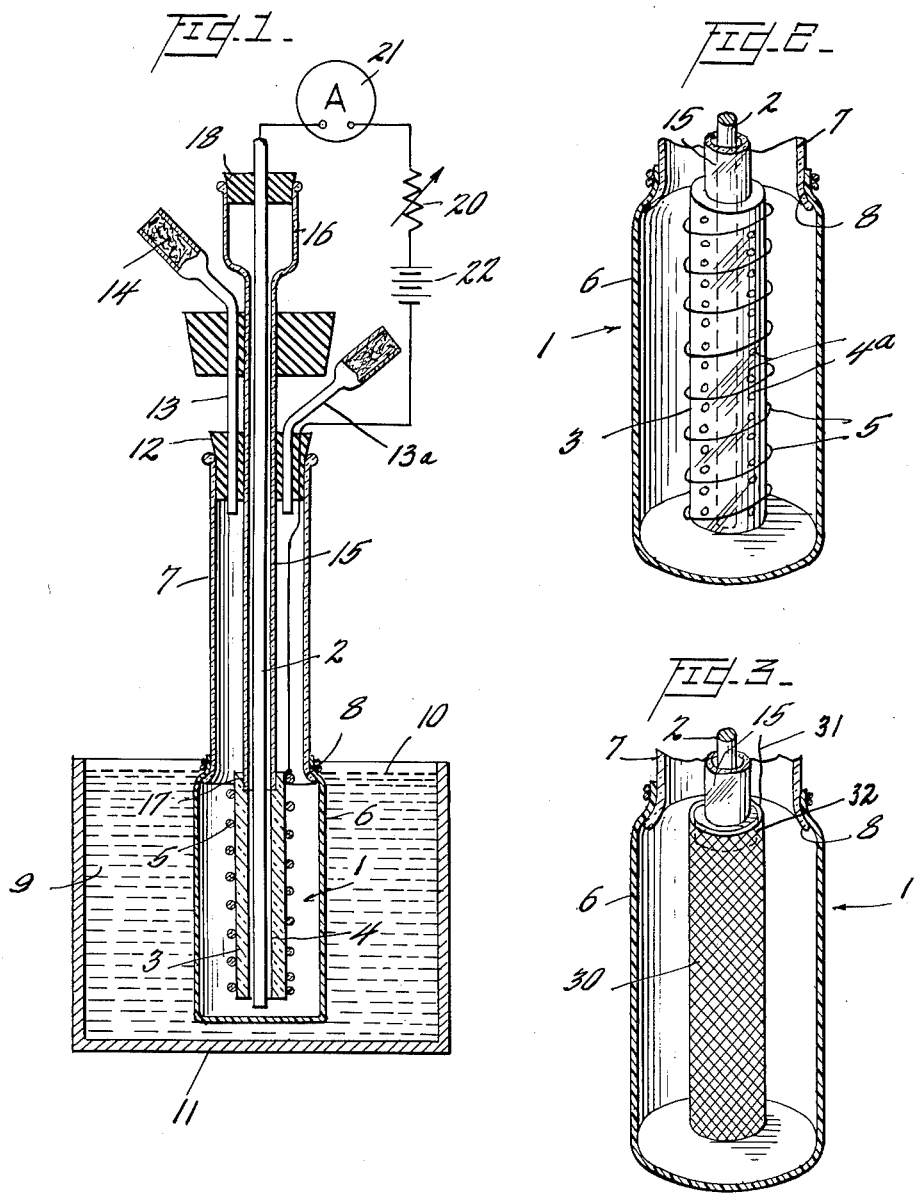
INVENTORS
Kenneth W. Thompson
Richard T. Price
S. Z. Lewin,
BY Hugo E. Weisburger
ATTORNEY

United States Patent Office

3,065,156
Patented Nov. 20, 1962

3,065,156
ELECTROLYTIC pH REGULATOR
Kenneth Wade Thompson, Montclair, and Richard Thompson Price, Verona, N.J., and Seymour Z. Lewin, Bayside, N.Y., assignors to Organon Inc., West Orange, N.J., a corporation of New Jersey
Filed Aug. 29, 1961, Ser. No. 134,653
19 Claims. (Cl. 204—130)

This invention relates to a device and method for regulation of the hydrogen ion concentration of biological culture media, under aseptic conditions, if desired. More particularly, the invention concerns a novel electrolytic pH regulator for microbial, cell and tissue culture media.

The cultivation and growth of microbes, yeasts, single cells, tissue cells, and viruses is commonly carried out in suitable vessels containing an appropriate nutrient medium, which may include, for example, inorganic salts, amino acids, vitamins, serums, and the like. The metabolic activity of the living cells normally results in the formation of waste products having an acid reaction, although under some circumstances, alkaline products may be formed as well. Present culture techniques require intermittent neutralization of acidity or alkalinity in the media by the addition thereto of sodium or other ions from outside sources to adjust pH. This is an operation which is difficult to perform while at the same time maintaining sterile conditions when the cultures are continued over many days or weeks. Thus, in long term cultures of mammalian cells or of bacteria there is a need for a means of continuous neutralization of acid or of alkali produced by the cells or bacteria, in order to provide optimal conditions for continued growth. In the case of the mammalian cells there is a need to neutralize acids, such as lactic acid, produced by the cultivated cells.

It is, therefore, a principal object of the present invention to provide an apparatus capable of regulating pH of media employed in biological culture, and particularly in continuous long term cell culture media and under aseptic conditions, if desired. Another object of the invention is to provide an electrolytic pH regulating means which is suitable for immersion in culture media and which contains an electrode system separated from the medium by a sheath comprising a membrane of a material which is permeable to ions and small molecules but is impermeable to cells or larger molecules such as protein molecules which may be present in the culture. It is a further object of the invention to provide an apparatus and method for generating hydrogen or hydroxyl ions by electrolytic action in the culture medium, and for removal of such ions to accomplish a change in the pH of the medium. A still further object is to provide a method and apparatus for accomplishing the purposes set forth which is readily adapted to automatic regulation and control.

This invention is based upon the principle of employing electrolysis of an aqueous system for the generation and removal of hydrogen or hydroxyl ions from the system. The device for accomplishing this objective includes a pair of metal electrodes, one of which is disposed within a hollow porous receptacle and spaced from the inner wall thereof, the second electrode surrounding the exterior wall of the receptacle while permitting the access of liquid to said exterior wall, and a sheath surrounding the electrode assembly, said sheath comprising a membrane of a material which is permeable to ions and small molecules but is impermeable to cells or large molecules, the electrodes being energized by a source of electric current, and the electrode assembly and surrounding sheath being immersed in the culture medium. The apparatus includes means for conducting away hydrogen or other gas generated by the electrolysis. The apparatus may also include tubes for irrigation and removal thereby of noxious products that may form in the electrolysis area. The electrodes are connected to a source of direct current by means of a reversing switch to permit manual reversal of polarity. Such reversal of polarity may also be accomplished by conventional automatic detecting and switching means. Alternatively, the second electrode comprises a hollow porous metal cylinder within which the first electrode is disposed and spaced from the inner wall thereof.

For a better understanding of the invention and its various objects, advantages and details, present preferred embodiments thereof will be described with reference to the accompanying drawing, in which:

FIG. 1 is a sectional elevation of the apparatus shown with the operating portion immersed in a culture vessel.

FIG. 2 is an enlarged view showing the relationship of electrodes, porous receptacle and surrounding membrane.

FIG. 3 is an enlarged view similar to FIG. 2 showing a different form of porous receptacle.

Referring to FIG. 1, the operating portion of the device is designated generally at 1. It includes a centrally located electrode 2 which is preferably a rod of silver, extending the length of the apparatus, and readily removable for purposes of weighing or replacement. The electrode 2 extends through and is disposed within a hollow porous tubular receptacle 3, being spaced away from the inner wall 4 of said receptacle. Receptacle 3 may be made of any suitable glass or ceramic porous material, but is preferably a fritted glass tube having relatively coarse porosity and containing opening or perforations 4a to allow for better circulation of liquid therethrough. A second electrode 5, preferably made from a metal which is inert toward the culture medium, such as platinum wire, is wound spirally around the receptacle 3. The pair of electrodes and the receptacle 3 are surrounded by a sheath 6 which comprises a membrane of a material which is permeable to ions and small molecules but impermeable to cells or large molecules. The sheath may be made of any material which permits dialysis of the ions present, such as a plastic film, for example, a regenerated cellulose film.

The operating or lower portion 1 of the apparatus is immersed in a culture medium 9 to an extent such that the liquid level 10 substantially encloses said operating portion, the culture medium being contained in a vessel designated as 11.

The upper portion of the apparatus serves as a support for the dialyzing sheath, the receptacle and the two electrodes. It comprises an elongated tubular member 7 which may be made of glass and which serves as a support for sheath 6 which is attached thereto at its lower end 8, for example, by a nylon thread. Tubular member 7 also serves as a means of collecting evolved gases, being closed at its upper end by a stopper, for example a rubber stopper 12, through which there extends a breather tube 13 which may be made of glass or of a flexible material such as nylon, and which is loosely sealed at its upper end, which is flared, by a cotton plug 14, to maintain sterile conditions. A similar breather tube 13a may be located at the opposite side of stopper 12, as shown.

Extending through tubular member 7 and spaced away from its inner wall is a glass tube 15, which may be a laboratory thistle tube having a flaring upper end 16. Thistle tube 15 at its lower end provides a means of support for receptacle 3 into which it extends and to which it is attached at 17. The thistle tube also serves as a means of mounting the rod electrode 2 so that the electrode is centrally disposed therein, by means of stopper 18 through which the electrode 2 extends. The inside diameter of the thistle tube is sufficiently large to permit ready vertical movement of the silver rod electrode 2, so that it can be easily removed, together with any deposits that may be formed on said rod. The platinum wire electrode 5 is carried upward from its spirally wound portion through stopper 12. The electrodes 2 and 5 are connected by wires through a rheostat 20 and an ammeter 21 to a battery or other source of direct current 22. If desired, a reversing switch, not shown, may be inserted in the circuit to provide for reversal of polarity. It will be understood that the current supply circuit can include conventional automatic regulation and control devices responsive to changes or variations in the pH of the culture medium from a desired value, a pH meter and pH electrodes. For manual operation, the starting and stopping of the apparatus may be carried out in response to color changes of an indicator such as phenol red.

In an alternative embodiment depicted in FIG. 3, the porous receptacle 3 and spiral electrode 5, are replaced by a tubularly shaped metal gauze or mesh 30, such as platinum gauze, which serves as an electrode and also permits diffusion of the culture medium therethrough. The electrode 30 is supported on glass tube 15 by means of a stopper of non-conducting material 32, and is connected to the current source by lead-in wire 31.

The entire apparatus is constructed of materials which permit sterilization without adverse effects. The apparatus permits replacement of the silver electrode under sterile conditions when this is necessary.

The process of the invention is not limited to the particular form of apparatus described, as numerous variations are possible as long as provision is made for the various novel features of the invention, namely the employment of electrolytic regulation of pH by means of a pair of electrodes separated by a porous receptacle and surrounded by a membrane of limited permeability.

The operation of the device is as follows: The operating portion 1 of the apparatus is immersed in the culture medium the pH of which is to be regulated so that the lower end of electrode 2 and the spirally wound portion of electrode 5, and the receptacle 3 and sheath 6 are beneath the liquid level. Where adjustment is to be made to the acidity of the medium, which will normally contain various ions, including sodium and chloride ions, the electrodes are connected to the battery or other current source so that the negative pole of the battery is attached to the platinum electrode and the positive pole is attached to the silver rod. The externally applied voltage is not critical and may range, for example from about 1 to 100 volts, preferably about 6 volts. When the electrodes are energized by the electric current, the platinum electrode being connected as the cathode, that is, connected to the negative pole of the battery, hydrogen ions migrate to the platinum electrode and hydrogen gas is evolved. At the same time silver ions are formed at the silver electrode and these silver ions react with the chlorine ions present to form insoluble silver chloride which deposits on the silver electrode. This removal of hydrogen ions from the system with the simultaneous removal of a non-basic anion (chloride), results in an increase of the pH, that is, a decrease in acidity, which is equivalent to neutralization of the acids present by physical removal from the solution of hydrogen chloride. This differs therefrom in a fundamental way from neutralization of acid by the addition of a discrete base. The selective permeability of the membrane permits free passage of ions to the regions of electrolysis, and vice versa. When the polarity of the current is reversed, hydroxyl ions are liberated at the platinum electrode where oxygen gas is evolved, and silver chloride present on the silver electrode dissociates with liberation of chloride ions, silver metal being deposited on the surface of the silver electrode. Hence for neutralization of alkalinity in the medium, silver chloride must first be deposited on the silver electrode. The net effect of these last or opposite reactions at the electrodes is to produce hydrogen ions without simultaneously producing a basic anion (OH). This corresponds to the introduction of new hydrogen and chloride ions into the medium. These dialyze out of the membrane and neutralize whatever basic ions are present. At the same time the evolved hydrogen or oxygen is led upward into the glass tubular member so that it does not mix with the gas phase of the culture, and is vented outside the culture chamber.

The acidic or basic ions as they form in excess inside the membrane dialyze outward into the medium where they perform their neutralization function, while the silver chloride or silver metal formed inside the porous glass cylinder is retained there on the silver electrode.

The unique feature of the principle embodied in this apparatus is that it accomplishes in this system an effect analogous to the fundamental biological mechanism known as the "chloride shift." That is, an increase (or decrease) in the "alkali reserve" is accomplished by a shift of hydrogen and choride ions from (or to) liquid phase to (or from) solid (electrode) phase.

The silver rod electrode can readily be removed, cleaned, and replaced by sterile manipulations whenever the deposit thereon becomes thick enough to impede materially conduction of the current and the regulation process. Deleterious products such as any silver chloride which flakes off or reaction products of silver chloride with other substances that may dialyze inside the sheath, e.g. toxic substances, can be removed by inserting a thin irrigation tube through breather tube 13 to extend to the bottom of the apparatus, and a similar irrigation tube through breather tube 13a extending to the top of the liquid. By supplying saline water to the latter tube 13a, displacement of the contents of sheath 6, through tube 13 takes place.

The apparatus of the invention can readily be used for quantitative measurement of acid or alkali neutralized. For example, when a silver rod is employed as the electrode, with an average of about 20 milliamperes of current, one milliequivalent of acid is neutralized in about 80 minutes. The speed of neutralization may be adjusted from this comparatively rapid rate to any desired slower rate by reducing the current input. Since the reaction of neutralization of acid or of alkali by the apparatus of the invention is quantitative, the amount of acid neutralized, for example, may be estimated either by measuring the amount of current and the time employed for the electrolysis, or else the amount of silver utilized may be measured gravimetrically. Thus, for example, 0.10788 gm. of pure silver is consumed per milliequivalent of acid neutralized. The time for neutralization of 1 milliequivalent of acid can be calculated from the formula:

$$\text{time (sec.)} = \frac{96{,}500 \text{ milliampere seconds}}{\text{milliamperes}}$$

The pure silver electrode, which is removable, may be either in the form of a rod, as previously described, or may also be in the form of a wire or ribbon. The wire or ribbon is especially suitable when attached to a length of platinum wire, just enough silver being provided to neutralize a desired amount of acid. Thus, one may supply a length of silver wire or ribbon equivalent to a given number of milliequivalents of acid to be neutralized, and this amount of silver when immersed in the bath inside the porous receptacle and completely consumed will have provided for neutralization of that amount of acid.

The novel method of the present invention for the electrolytic regulation of the pH of an aqueous bath containing an excess of hydrogen, hydroxyl ions, or chloride ions by removal of the undesired excess of said ions from the bath includes the steps of immersing in the bath a pair of metal electrodes separated from each other but in electrolytic contact, and separated from the bath by a sheath or membrane permeable to or capable of dialysis of said ions, and passing a direct current between the immersed electrodes to produce or remove hydrogen and chloride ions, depending upon the polarity of the current. The arrangement of the electrodes may be such that the inner electrode is separated from the outer electrode by a rigid porous diaphragm, as shown in FIG. 1, or the inner electrode may be surrounded by a porous outer electrode in the form of gauze or mesh, as shown in FIG. 3. The inner electrode is preferably of silver, and the outer electrode of platinum.

The membrane is made of any suitable synthetic plastic or natural film material which is permeable to said ions and which is substantially inert to both pH and to sterilizing procedures, having a thickness ranging generally between about 1 and 4 mils, but these thicknesses are not critical. Thus there can be used parchment, or else a water-swelling film of a nonfibrous cellulosic material such as, for example, regenerated cellulose hydrate, commonly known at cellophane, or cellulose esters or ethers or mixed esters and mixed ethers. The preferred material is regenerated cellulose film, for example, in the form of tubing, having a wall thickness ranging from about 0.0016 inch to about 0.0035 inch.

The operation of the apparatus and method of the invention will be better understood with reference to the following examples, which are to be regarded as illustrative, and not as limiting.

EXAMPLE 1

The function of the apparatus under controlled conditions of acidity induced by presence of an excess of carbon dioxide was demonstrated by employing a biological culture medium of the type used in cell culture, and having the following composition:

*Amino Acids*

| Compound: | Concentration (mm.) |
|---|---|
| Arginine | 0.6 |
| Cystine | 0.1 |
| Glutamine | 2.0 |
| Histidine | 0.2 |
| Isoleucine | 0.4 |
| Leucine | 0.4 |
| Lycine | 0.4 |
| Methionine | 0.1 |
| Phenylalanine | 0.2 |
| Threonine | 0.4 |
| Tryptophan | 0.05 |
| Tyrosine | 0.2 |
| Valine | 0.4 |
| l-aspartic acid | 0.1 |
| l-glutamic acid | 0.1 |
| l-alanine | 0.1 |
| l-serine | 0.1 |
| Glycine | 0.1 |
| l-asparagine | 0.1 |
| l-proline | 0.1 |

*Salts*

| | Gm./l. |
|---|---|
| Sodium chloride | 5.49 |
| Potassium chloride | 0.3 |
| Sodium phosphate (monobasic) $\cdot H_2O$ | 0.1 |
| Sodium hydroxide | 1.19 |
| Magnesium chloride $\cdot 6H_2O$ | 0.177 |
| Calcium chloride $\cdot 2H_2O$ | 0.0232 |
| Sodium citrate (tribasic) $\cdot 2H_2O$ | 1.53 |
| Carbon dioxide q.s. to adjust pH to 7.35. | |

*Vitamins*

| | Concentration (mg./l.) |
|---|---|
| Biotin | 2.0 |
| Riboflavin | 0.2 |
| Folic acid | 2.0 |
| Choline chloride | 2.0 |
| Pyridoxal HCl | 2.0 |
| Thiamine HCl | 2.0 |
| Cyanacobalamin | 0.4 |
| i-inositol | 2.0 |
| p-aminobenzoic acid | 0.125 |
| Nicotinamide | 2.0 |
| Calcium pantothenate | 2.0 |
| Ascorbic acid | 20.0 |
| Vitamin A alcohol | 0.25 |
| Vitamin D | 0.25 |
| dl-α-Tocopherol | 0.025 |
| Vitamin $K_1$ | 2.0 |
| α-Lipoic acid | 1.0 |

*Indicator*

| | Mg. |
|---|---|
| Phenol Red | 10 |

*Serum Fraction*

| | Ml. |
|---|---|
| Bacto PPLO serum fraction (Difco Laboratories) | 10 |

*Trace Elements*

| | Mg./l. |
|---|---|
| Ferric nitrate $(Fe(NO_3)_3 \cdot 9H_2O)$ | 8.08 |
| Zinc sulfate $ZnSO_4 \cdot 7H_2O$ | 8.63 |
| Cobalt chloride $CoCl_2 \cdot 6H_2O$ | 0.048 |
| Manganese chloride $MnCl_2 \cdot 4H_2O$ | 0.099 |
| Cupric sulfate $CuSO_4 \cdot 5H_2O$ | 1.0 |

*Carbohydrates*

| | Mm. |
|---|---|
| Glucose (anhydrous) | 5.5 |
| Sodium pyruvate | 1.0 |

During preparation this culture medium was equilibrated with a gas mixture containing approximately 10% by volume of carbon dioxide in order to establish a pH of 7.35, representing the optimum for a cell culture. 500 ml. of the culture medium thus treated had its pH lowered further by equilibration with additional carbon dioxide in a closed system until the pH reached a constant value of 7.12 due to formation of carbonic acid in the solution. The pH regulation device shown in FIG. 1 was then immersed in the culture medium, and an average current of 25 milliamperes at an external applied voltage of 6 volts was passed through the medium for 107 minutes, the electrodes being arranged to remove hydrogen and chloride ions. At the end of this time the pH had risen to 7.20. The current was applied for another 260 minutes, at which time the pH had risen to 7.37, the desired value.

EXAMPLE 2

The apparatus of FIG. 1 was introduced into 500 ml. of the culture medium described in Example 1, to which there had been added about 1 milliequivalent of lactic acid, representing the product of cell metabolism.

An average of 125 milliamperes at an external applied voltage of 6 volts was passed through the culture medium for a period of 8 minutes at a temperature of 37° C. At the end of this period the acidity of the bath was measured by means of glass electrode-calomel reference electrode system with Beckman Zeromatic pH meter.

The acidity had been lowered and the pH increased from 7.17 to a reading of 7.35. The current was allowed to continue to a pH of 7.52 which required an additional 27 minutes at an average current density of 80 milliamperes.

After equilibration the polarity was reversed and the pH lowered from 7.52 to 7.33 which required 24 minutes at an average current density of 160 milliamperes.

If cells had been present, their growth and function would have continued at their optimum at a pH of about 7.35.

EXAMPLE 3

An isotonic solution of sodium chloride, containing 0.9% NaCl by weight in water, was prepared. To 500 ml. of this solution there was added 1 milliequivalent of lactic acid. The resulting solution had a pH of 3.4. Regulation of the pH of the solution by immersing therein the apparatus of the invention applying a current averaging 27.5 milliamperes and 3.7 volts, resulted in an increase of the pH value to 7.35 after 58.5 minutes, and upon continued application of current, the pH rose to a value of 9.51 in 70 minutes.

What is claimed is:

1. Method for the electrolytic regulation of the pH of an aqueous bath containing an excess of hydrogen or hydroxyl ions by removal of said ions which comprises the steps of immersing in said bath a pair of metal electrodes separated from the bath by a membrance permeable to said ions and surrounding both electrodes, and passing a direct current between said immersed electrodes to cause said excess ions to migrate from the bath to the electrodes in accordance with the polarity of the current.

2. Method for electrolytically increasing the pH of an aqueous bath containing an excess of hydrogen and chloride ions by removal of said ions which comprises the steps of immersing in said bath a pair of inner and outer metal electrodes, the inner electrode being separated from the outer electrode by a rigid porous diaphragm, and both electrodes being separated from the bath by a membrance permeable to hydrogen and chloride ions and surrounding both electrodes, and passing a direct current between said immersed electrodes to cause said excess hydrogen and chloride ions to be removed from the bath in accordance with the polarity of the current.

3. Method for electrolytically increasing the pH of an aqueous bath containing an excess of hydrogen and chloride ions by removal of said ions which comprises the steps of immersing in said bath a pair of inner and outer metal electrodes, the inner electrode being surrounded by a porous outer electrode, and both electrodes being separated from the bath by a membrane permeable to hydrogen and chloride ions and surrounding both electrodes, and passing a direct current between said immersed electrodes to cause said excess hydrogen and chloride ions to be removed from the bath in accordance with the polarity of the current.

4. The method of claim 1 in which the aqueous bath is a biological culture medium.

5. The method of claim 1 in which the electrolysis is performed under aseptic conditions.

6. The method of claim 1 in which deleterious products formed during the electrolysis are removed by irrigating the interior of said membrance.

7. The method of claim 2 in which the inner electrode is silver and the outer electrode is platinum.

8. The method of claim 3 in which the inner electrode is silver and the outer electrode is platinum gauze.

9. Apparatus for the electrolytic regulation of the pH of an aqueous bath by removal of hydrogen, hydroxyl or chloride ions contained in said bath which comprises a pair of spaced metal electrodes, both electrodes being enclosed within a surrounding membrane which is permeable to said ions when the apparatus is immersed in said bath, and means for supplying direct current to said electrodes.

10. Apparatus for the electrolytic regulation of the pH of an aqueous bath by removal of hydrogen, hydroxyl, or chloride ions contained in said bath which comprises a pair of metal electrodes separated from each other by a rigid porous diaphragm, both electrodes and said porous diaphragm being enclosed within a surrounding membrane which is permeable to said ions when the apparatus is immersed in said bath.

11. Apparatus for the electrolytic regulation of the pH of an aqueous bath by removal of hydrogen, hydroxyl, or chloride ions contained in said bath which comprises a pair of inner and outer metal electrodes, the inner electrode being surrounded by and spaced apart from the outer electrode, the outer electrode being porous, and both electrodes being enclosed within a surrounding membrane which is permeable to said ions when the apparatus is immersed in said bath.

12. Apparatus for the electrolytic regulation of the pH of an aqueous bath by removal of hydrogen, hydroxyl, or chloride ions contained in said bath which comprises a pair of metal electrodes, one of which is disposed within a hollow porous receptacle and spaced from the inner wall thereof, the second electrode surrounding the exterior wall of said receptacle while permitting access of bath liquid to said exterior wall, and a surrounding membrane enclosing the assembly of electrodes and receptacle, said membrane being permeable to said ions when the apparatus is immersed in said bath.

13. Apparatus for the electrolytic regulation of the pH of an aqueous bath by removal of hydrogen, hydroxyl, or chloride ions contained in said bath, said hydrogen ions being removed in the form of hydrogen gas, which comprises a silver electrode disposed within a hollow porous receptacle and spaced from the inner wall thereof, and a platinum electrode surrounding the exterior wall of said receptacle while permitting access of bath liquid to said exterior wall, and a surrounding membrance enclosing the assembly of electrodes and receptacle, said membrane being permeable to said ions when the apparatus is immersed in said bath, and means for conducting hydrogen gas away from said electrodes.

14. The apparatus of claim 13 in which the silver electrode is a silver rod and the platinum electrode is spirally wound around the exterior wall of the receptacle.

15. The apparatus of claim 9 in which the membrane is a plastic film.

16. Apparatus for the electrolytic regulation of the pH of an aqueous bath by removal of hydrogen, hydroxyl or chloride ions contaned in said bath, said hydrogen ions being removed in the form of hydrogen gas, which comprises a lower portion including a pair of inner and outer metal electrodes, the inner electrode being separated from the outer electrode by a rigid porous diaphragm, and a surrounding membrane which is permeable to said ions enclosing both electrodes and said porous diaphragm when said lower portion is immersed in said bath, and an upper portion mounted on said lower portion including an elongated tubular member closed at its upper end, and a narrower tubular member extending longitudinally of and concentric with said elongated tubular member, said inner electrode extending through the interior of said narrower tubular member and said outer electrode extending though said elongated tubular member, and means for conducting hydrogen gas upward through said elongated tubular member and outward from the apparatus.

17. The apparatus of claim 16, including means for irrigation of the interior of said membrane.

18. Apparatus for the electrolytic regulation of the pH of an aqueous bath by removal of hydrogen, hydroxyl, or chloride ions contained in said bath which comprises a lower portion including a pair of inner and outer metal electrodes, the inner electrode being surrounded by and spaced apart from the outer electrode, the outer electrode being a cylindrical metal mesh, both electrodes being enclosed within a surrounding membrane which is permeable to said ions when said lower portion is immersed in said bath, and an upper portion mounted on said lower portion including an elongated tubular member closed at its upper end, and a narrower tubular member extending longitudinally of and concentric with said elongated tubular member, said inner electrode extending through the interior of said narrower tubular member and connecting means for said outer electrode extending through said elongated tubular member, said outer electrode being supported by said elongated tubular member, and means for conducting hydrogen gas upward through said elongated tubular member and outward from the apparatus.

19. The apparatus of claim 18, including means for irrigation of the interior of said membrane.

References Cited in the file of this patent

UNITED STATES PATENTS

| | | |
|---|---|---|
| 1,371,698 | Linder | Mar. 15, 1921 |
| 1,740,165 | Engelhardt | Dec. 17, 1929 |
| 2,159,074 | Briggs | May 23, 1939 |
| 2,322,545 | Sandstrom | June 22, 1943 |
| 2,651,612 | Hatter | Sept. 8, 1953 |
| 2,943,028 | Thayer et al. | June 28, 1960 |

FOREIGN PATENTS

| | | |
|---|---|---|
| 18,795 | Great Britain | June 17, 1914 |